June 4, 1935. G. A. GLOOR 2,003,532
BEVERAGE COOLING AND DISPENSING DEVICE
Filed June 18, 1934
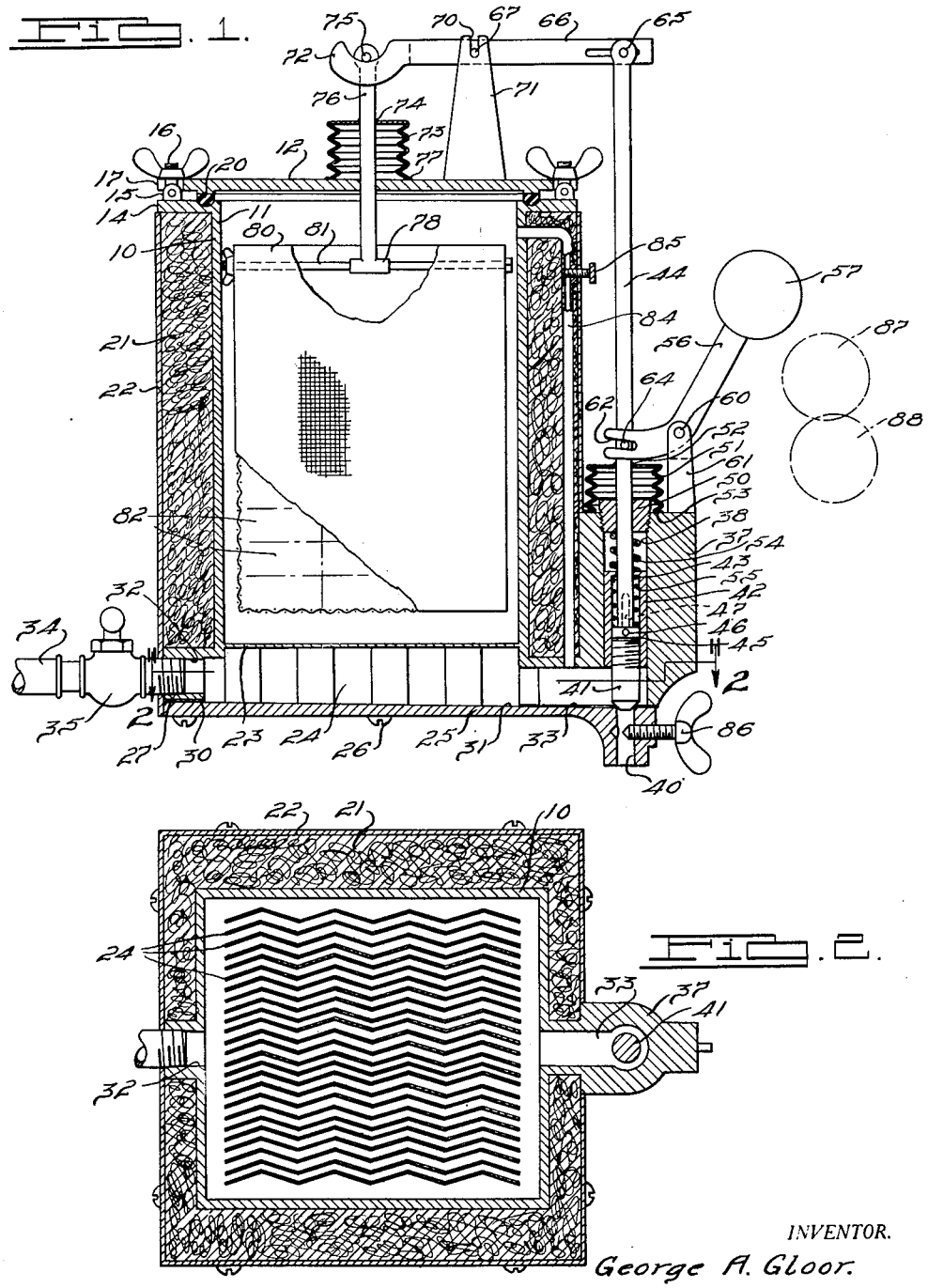
INVENTOR.
George A. Gloor.
BY
Harness, Dickey, Pierce & Hann
ATTORNEYS.

Patented June 4, 1935

2,003,532

UNITED STATES PATENT OFFICE 2,003,532

BEVERAGE COOLING AND DISPENSING DEVICE

George A. Gloor, Dearborn, Mich.

Application June 18, 1934, Serial No. 731,039

8 Claims. (Cl. 225—40)

This invention relates to the dispensing of liquids and more especially to a device utilizing a solid vaporizable refrigerant, such as carbon dioxide, for cooling and/or aerating beverages or other desired liquids.

The principal object of the invention is to facilitate the art of rapidly cooling and dispensing liquids.

A further object is to provide an approved construction for dispensing liquids and cooling the same immediately prior to the delivery thereof.

Another object is to provide a dispensing suction adapted rapidly to cool small amounts of beverages preparatory to the delivery thereof in glass quantities.

Other objects of the invention are: to provide a dispensing and cooling device which cools only that portion of the beverage which is immediately to be drawn off; to aerate beverage immediately prior to its delivery from the device; to control the rate of cooling of the beverage substantially in proportion to the rate at which it is to be drawn from the device; and to provide manual actuating means for controlling the cooling and delivery of a beverage, which means is so constructed and arranged that the delivery means is rendered effective only after the cooling means has been placed in operation.

Other objects, features and advantages will become apparent from the following description and appended claims.

For the purpose of illustrating the genus of the invention, a typical concrete embodiment thereof is shown in the accompanying drawing, in which:

Figure 1 is a substantially central vertical section, parts being broken away to show interior details thereof, of a dispensing and cooling device constructed according to the principles of this invention; and Figure 2 is a horizontal section taken substantially along the line 2—2 of Figure 1.

In the dispensing of cooled or refrigerated liquids, it is desirable, in order to effect economy of operation, to cool only that portion of the liquid which is immediately to be drawn off, and to render the refrigerating means ineffective or less effective during intervals when no liquid is to be dispensed. This is especially desirable when liquid is to be withdrawn intermittently from a cooling and dispensing device and at irregular intervals.

This invention contemplates the provision of means for cooling rapidly only that portion of liquid which is immediately to be dispensed by rendering refrigerating means effective, or of increased effectiveness, preparatory to withdrawing liquid from the dispensing apparatus and then effecting delivery of the liquid. A common control means is employed for effecting the above operations.

Referring to the drawing, the numeral 10 designates a housing member provided with a refrigerant chamber 11 therein and adapted to be closed by a removable cover 12. A flanged rim 14 is provided at the upper portion of the housing 10 and serves as a support for ears 15, upon which bolt and wing nut fasteners 16 are pivoted so as to cooperate with slots 17 provided in the cover 12 for securing the cover to the housing member and compressing a gasket 20 between such cover and flange in order to effect a seal therebetween. Side walls of the housing 10 may be suitably insulated as indicated at 21 and the insulation protected by sheathing 22.

The bottom wall of the housing 10, indicated at 23, is preferably made comparatively thin and of a heat conducting material. A plurality of fins 24, also of heat conducting material, are intimately joined with the bottom wall 23 preferably by welding or by casting the fins integral with the bottom wall of the housing member. A removable bottom cover plate 25 is fastened, as by screws 26, to a bottom flange 27 of the housing 10 with a gasket 30 interposed therebetween to seal off a liquid container 31 interposed between the bottom cover plate 25 and the thin bottom wall 23 of the refrigerant chamber 11. The fins 24 extend the full height of the liquid container 31 as indicated in Figure 1, and as indicated in Figure 2, and made comparatively thin and of wave-like formation. The fins 24 are preferably arranged in spaced parallel relation and extend in a general direction from an inlet 32 to an outlet 33. The bottom cover plate 25 slopes slightly downward from the inlet 32 to the outlet 33. The inlet passage 33 is threaded for the reception of an intake conduit 34 adapted to communicate with a source of supply of liquid, not shown, such as a beverage. A shut off valve 35 is provided in the conduit 34 for shutting off the supply of liquid.

A boss portion 37 is provided on one side of the housing member 10, and this boss portion is provided with vertically extended and aligned passages 38 and 40, the passage 38 extending upwardly from and communicating with the outlet passage 33 and the second passage 40 leading downwardly from and communicating with the outlet passage 33. A valve 41 is adapted to seat in the upper end of the passage 40 to close the latter. The valve 41 is threadedly connected to one end of a sleeve 42 disposed for reciprocation within the passage 38, and the remaining end of the sleeve 42 is provided with an inwardly directed flange 43 adapted slidably to receive an operating rod 44. A collar member 45 is fixed to the lower end of the operating rod 44 by means of a pin 46 which projects outwardly beyond the periphery of the collar and into diametrically opposite slots 47 provided in the sleeve member 42. The collar member 45 makes a sliding fit within the sleeve member 42. A bearing plug 50 is threaded into the upper end of the vertical passage 38 slidably to receive the operating rod 44. A sylphon bellows 51 is employed to effect a seal between the operating rod 44 and the upper end of the boss portion 37 of the housing member 10. The sylphon bellows 51 is preferably welded at one end to the operating rod 44 as indicated at 52 and at the other end to the top of the boss portion 37 as indicated at 53.

A comparatively heavy spring 54 is coiled about the operating rod 44 and interposed in compressed condition between the plug member 50 and the flanged end 43 of the sleeve member 42 normally to urge the sleeve member and the valve 41 downwardly so that the latter seats within the upper end of the passage 40 to close the same. A lighter coil spring 55 is also disposed around the operating rod 44 and arranged in compressed condition between the flange 43 of the sleeve 42 and the collar member 45 so that it normally biases the operating rod 44 in a downward direction to maintain the pin 46 at the lower end of the slot 47. Upward movement of the operating rod 44 serves to overcome the biasing action of the light coil spring 55 causing the pin member 46 to move upwardly within the slot 47 until the pin reaches its upper end. Continued upward movement of the operating rod 44 after the pin 46 has reached the upper end of the slot 47 effects the elevation of the sleeve member 42 against the biasing action of the heavier coil spring 54 and opens the valve member 41.

A manual control lever 56 provided with a ball or handle portion 57 is pivoted as indicated at 60 to a bracket member 61 fixed to the upper end of the boss portion 37 and is provided at the other end with a slot 62 adapted to cooperate with a pin 64 projecting through the operating rod 44 for elevating the latter. The upper end of the operating rod 44 is connected by a pin and slot connection 65 to one end of a beam member 66 which is provided with a pin 67 at an intermediate point adapted to be received in an open notch 70 at the upper end of an upstanding bracket 71 fixed to the top cover plate 12 and provided at the second end thereof with a forked portion 72 of saddle-like formation and adapted normally to cooperate with a pin 75 fixed to the upper end of an operating rod 76 for maintaining the latter in elevated position. The operating rod 76 is sealed to the cover plate 12 by means of a sylphon bellows 73 welded as indicated at 74 and 77 to the operating rod and cover plate 12.

The operating rod 76 is provided with a sleeve member 78 at the lower end thereof by which it may be detachably connected by means of a bolt and wing nut assembly 81 to a refrigerant holder 80 disposed within the refrigerant chamber 11. The refrigerant holder 80 is preferably in the form of a basket-like carrier having perforated or mesh wall and bottom portions of thin material. A vaporizable solid refrigerant 82, such as solid carbon dioxide, is arranged within the holder 80 and normally rests upon the bottom surface thereof. As the refrigerant 82 evaporates the space between the refrigerant and the side walls of the refrigerant chamber 11 increases. However, the space between the refrigerant and the thin bottom wall 23 remains stationed unless intentionally changed. While the coil spring 55 is made weaker than the coil spring 54, it is of sufficient strength normally to maintain the basket or holder 80 in elevated position and maintain the refrigerant spaced from the thin bottom wall 23.

A conduit 84 leads from the top of the refrigerant chamber 11 into the outlet passage 33 of the liquid container 31 so that the liquid therein may be carbonated, if desired. A throttle valve 85 is interposed within the conduit for regulating the amount of carbonation of the liquid within the container 31 or for shutting off the passage of carbon dioxide from the refrigerant chamber 11 to the passage 33. A throttle valve 86 is also provided in the passage 40 for adjustably restricting this passage so that the character of the foam produced upon a carbonated beverage may be controlled as desired.

In the operation of the device, a liquid to be dispensed and cooled is admitted through the inlet 32 into the liquid container 31 and may be cooled to a certain extent by heat transferred therefrom by means of the fins 24, the heat being absorbed in vaporizing the solid carbon dioxide 82 supported within the holder 80. When it is desired to dispense the liquid from the container 31 the cooling of the same may be intensified by actuating the manual control lever 57 in a clockwise direction viewed in Figure 1 to elevate the operating rod 44 against the tension of the coil spring 55 thus causing counter clockwise rotation of the beam member 66 and lowering of the refrigerant holder 80 until the refrigerant 82 is brought into close proximity to the thin heat conducting wall 23 of the refrigerant chamber 11. With the refrigerant 82 disposed closely adjacent the thin heat conducting wall 23, heat will rapidly be extracted from the liquid contained within the chamber 31 and the heat absorbed by the refrigerant 82. The fins 24 afford extensive surface area in contact with the liquid during the absorption of heat therefrom. After the manual operating lever 56 has been depressed to a position, such as indicated for example at 87, in which the refrigerant holder is lowered to a position adjacent the heat conducting wall 23, but before the valve 41 has been opened, and the actuating lever maintained in this position for a few seconds, it may be then depressed to a further position, indicated at 88, which effects the elevation of the sleeve 42 within the passage 38 and opens the valve 41 permitting a cooled or refrigerated liquid to be dispensed from the device.

As soon as the manual operating lever 56 has been released the spring 54 closes the valve 41 shutting off further delivery of liquid from the container 31 and the spring 55 expands and draws the operating rod 44 downwardly thus effecting the elevation of the refrigerant holder and separating the refrigerant 82 from the heat conducting wall 23, thus rendering the transfer of heat from any liquid contained within the chamber 31 to the refrigerant ineffective or at least less effective. This effects an economy in the amount of vaporizable refrigerant required.

As many changes could be made in the above construction and many apparently widely different embodiments of this invention could be had without departing from the spirit thereof, it is intended that all matter contained in the above description or shown in the accompanying drawing shall be interpreted as illustrative and not in a limiting sense.

What is claimed is:

1. A dispensing and cooling device comprising a housing including a liquid container and a refrigerant chamber, a heat conducting wall separating said container and chamber, a refrigerant holder arranged in said chamber, dispensing means for delivering liquid from said container, means normally maintaining said holder in spaced relation with respect to said heat conducting wall and means operable by said dispensing means for adjusting said holder relative to said heat conducting walls to regulate the transmission of heat from the liquid container to the refrigerant chamber.

2. A liquid dispensing apparatus, the combination of a liquid container, a refrigerant chamber having a heat conducting wall adapted to contact the liquid in said container, dispensing means communicating between the interior of said container and the exterior of the apparatus and including a manual actuating lever for controlling the flow of liquid therethrough, a refrigerant holder arranged in said chamber, means normally sustaining said holder spaced from said heat conducting wall, and means operable by said manual actuating lever for moving said holder toward said heat conducting wall.

3. A liquid dispensing apparatus, the combination of a liquid container, a refrigerant chamber having a heat conducting wall adapted to contact the liquid in said container, dispensing means communicating between the interior of said container and the exterior of the apparatus and including a manual actuating lever for controlling the flow of liquid therethrough, a refrigerant holder arranged in said chamber, means normally sustaining said holder spaced from said heat conducting wall, and means operable upon movement of said manual actuating lever in one direction for first bringing the holder closely adjacent said heat conducting wall, and then to render said dispensing means effective for delivering liquid therethrough.

4. A liquid dispensing apparatus, the combination of a liquid container, a refrigerant chamber having a heat conducting wall adapted to contact the liquid in said container, a plurality of fins integrally joined to said heat conducting wall and extending into said container so as to contact the liquid therein, dispensing means communicating with the interior of said container and the exterior of the apparatus and including a manual actuating lever controlling the flow of liquid therethrough, a refrigerant holder arranged in said chamber, means normally maintaining said holder spaced from said heat conducting wall, and means operable upon movement of said manual actuating lever in one direction for first bringing the holder closely adjacent said heat conducting wall and then rendering said dispensing means effective for delivering liquid therethrough.

5. A liquid dispensing apparatus, the combination of a liquid container, a refrigerant chamber having a heat conducting wall adapted to contact the liquid in said container, dispensing means communicating between the interior of said container and the exterior of the apparatus and including an outlet passage and manual control means for regulating the flow of liquid through said outlet passage, a holder for a solid vaporizable refrigerant arranged in said chamber, means normally supporting said holder spaced from said heat conducting wall, means operable by said manual control means for moving said holder toward the said heat conducting wall, and a conduit communicating between the interior of said refrigerant chamber and said liquid container for aerating the liquid contained in said liquid container.

6. In liquid dispensing apparatus, the combination of a liquid container, a refrigerant chamber having a heat conducting wall adapted to contact the liquid within said container, dispensing means communicating between the interior of said container and the exterior of the apparatus and including a manually operable actuating lever for controlling the flow of liquid therethrough, a vaporizable refrigerant support in said chamber for movement toward and away from said heat conducting wall, and means operable upon movement of said lever between certain limits variably to control the distance between said refrigerant support and said heat conducting wall and operable upon further movement of said lever for delivering the liquid through said dispensing means.

7. A dispensing and cooling device comprising a housing including a liquid container and refrigerating chamber separated by a thin heat conducting wall, a holder for a solid vaporizable refrigerant arranged in said chamber and moveable toward and away from said heat conducting wall, dispensing means communicating between the interior of said container and the exterior of said device and including a manual actuating lever for controlling the flow therethrough, conduit means communicating between said refrigerating chamber and said container for aerating liquid therein, adjustable throttle valve means in said conduit means for controlling the aeration of the liquid in said container, resilient means normally supporting said holder spaced from said heat conducting wall, means operable by said manual actuating lever first to overcome the resilient means and move said holder closely adjacent said heat conducting wall for rapidly cooling the liquid in said container and then to cause the dispensing means to deliver liquid therethrough, and adjustable throttle valve means in said dispensing means for controlling the agitation of the liquid as it is delivered through the dispensing means.

8. In a dispensing and cooling device comprising a housing including a liquid container and a refrigerating chamber separated by a heat conducting wall, the combination of a holder for a vaporizable refrigerant arranged in said refrigerating chamber and moveable toward and away from said heat conducting wall, an operating rod extending from said holder to the exterior of said housing for moving said holder, and a sylphon bellows sealed at one end to said rod and at the other end to said housing for preventing leakage between the rod and housing.

GEORGE A. GLOOR.